United States Patent

Cheng et al.

Patent Number: 6,151,514
Date of Patent: Nov. 21, 2000

[54] METHOD AND APPARATUS FOR NORMALIZING DTMF MESSAGES FROM A CELLULAR MOBILE STATION

[75] Inventors: Heikwan Cheng, Richardson; Mark Chen, Plano, both of Tex.

[73] Assignee: Nortel Networks Corporation, Montreal, Canada

[21] Appl. No.: 09/064,530

[22] Filed: Apr. 22, 1998

[51] Int. Cl.[7] .................................................. H04Q 7/20
[52] U.S. Cl. ............................................ 455/564; 455/403
[58] Field of Search ............................... 455/550, 564, 455/565, 556, 557, 575, 406–409, 412, 418, 419, 403; 379/361, 386, 283, 418, 93.05, 165, 347; 370/345, 466, 473

[56] References Cited

U.S. PATENT DOCUMENTS

| | | | |
|---|---|---|---|
| 4,677,656 | 6/1987 | Burke et al. | 340/825.52 |
| 4,701,948 | 10/1987 | Molnar | 379/165 |
| 4,998,276 | 3/1991 | Hasegawa | 379/361 |
| 5,140,627 | 8/1992 | Dahlin | 455/436 |
| 5,276,729 | 7/1994 | Higuchi et al. | 455/418 |
| 5,280,516 | 1/1994 | Jang | 455/32.1 |
| 5,392,348 | 2/1995 | Park et al. | 379/386 |
| 5,428,671 | 6/1995 | Dykes et al. | 379/355 |
| 5,561,705 | 10/1996 | Allard et al. | 455/564 |
| 5,606,597 | 2/1997 | Newland | 455/464 |
| 5,633,862 | 5/1997 | Suzuki et al. | 455/84 |
| 5,644,623 | 7/1997 | Gulledge | 455/423 |
| 5,666,357 | 9/1997 | Jangi | 370/345 |
| 5,781,626 | 7/1998 | Koue | 379/361 |
| 5,825,871 | 10/1998 | Mark | 379/361 |
| 5,898,919 | 4/1999 | Yuen | 455/420 |
| 5,978,676 | 11/1999 | Guridi et al. | 379/386 |

OTHER PUBLICATIONS

Edward H. Lipper, Michael P. Rumsewicz; Teletraffic Considerations for Widespread Deployment of PCS; Sep./Oct. 1994, vol. 8, No. 5; pp. 1–20.

Raymond Steele; The Evolution of Personal Communications; Second Quarter 1994, vol. 1, No. 2; pp. 1–10.

*Primary Examiner*—William G. Trost
*Assistant Examiner*—Jean A. Gelin
*Attorney, Agent, or Firm*—Carr & Storm, L.L.P.

[57] ABSTRACT

A system for normalizing a Dual-Tone Multi-Frequency ("DTMF") tone is provided for use in a digital wireless telecommunications system. The normalization system has an electronic memory with normalization parameter variable that stores a redefinable value. A programmable DTMF tone generator circuit is coupled to the electronic memory. The tone generator circuit has an input terminal for receiving a DTMF message packet. A program, executable on the DTMF tone generator, normalizes the DTMF message packet by substituting the redefinable value of the parameter variable in the DTMF message packet such that a normalized DTMF tone is transmitted through an output terminal of the DTMF tone generator circuit.

17 Claims, 4 Drawing Sheets

FIG. 4
| DTMF_ON_LENGTH FIELD (BINARY) | RECOMMENDED PULSE WIDTH |
|---|---|
| 000 | 95 ms |
| 001 | 150 ms |
| 010 | 200 ms |
| 011 | 250 ms |
| 100 | 300 ms |
| 101 | 350 ms |
| ALL OTHER DTMF_ON_LENGTH CODES ARE RESERVED | |
FIG. 5
| DTMF_OFF_LENGTH FIELD (BINARY) | RECOMMENDED MINIMUM INTERDIGIT INTERVAL |
|---|---|
| 000 | 60 ms |
| 001 | 100 ms |
| 010 | 150 ms |
| 011 | 200 ms |
| ALL OTHER DTMF_OFF_LENGTH CODES ARE RESERVED | |
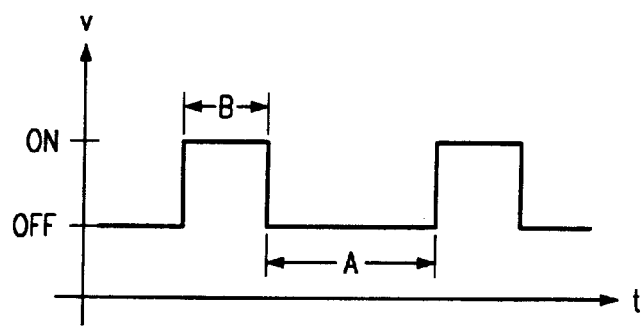
FIG. 6A
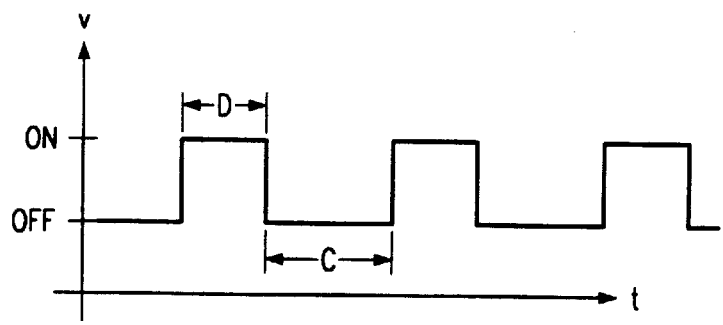
FIG. 6B

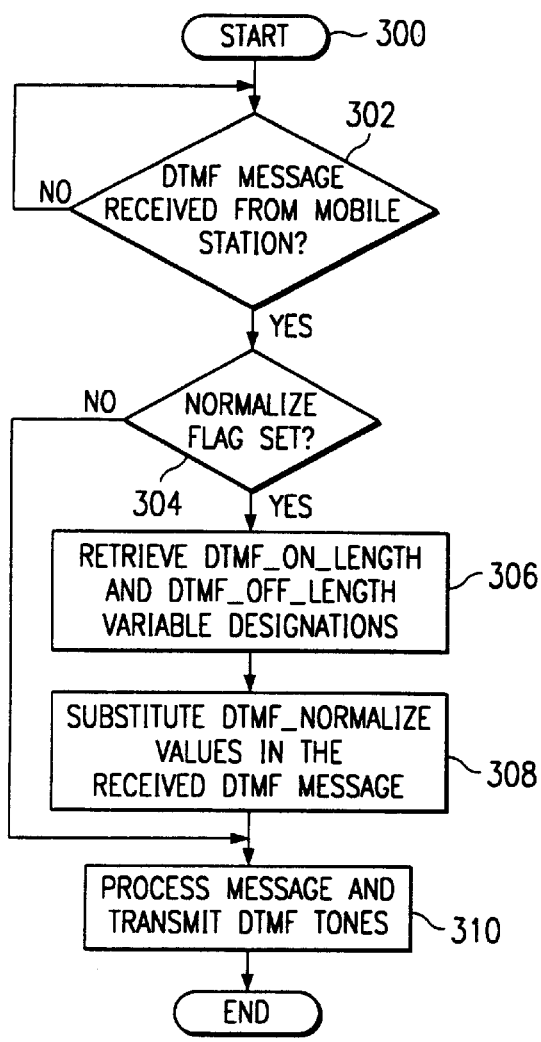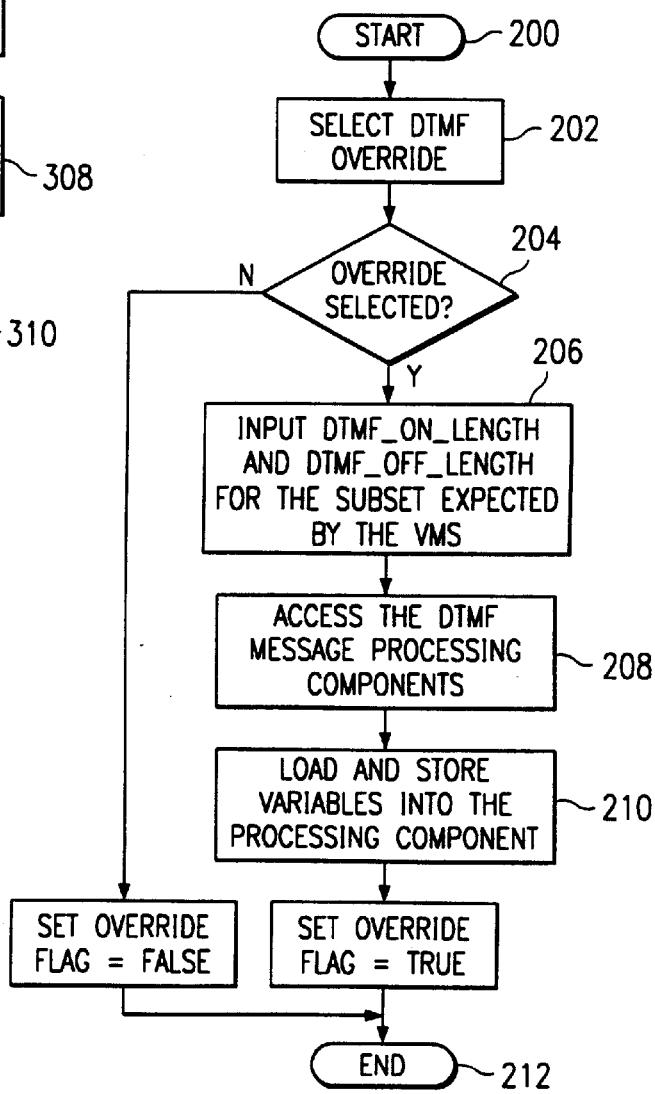

METHOD AND APPARATUS FOR NORMALIZING DTMF MESSAGES FROM A CELLULAR MOBILE STATION

TECHNICAL FIELD

The present invention relates to a method and apparatus for normalizing DTMF messages from a cellular mobile station, and in particular to normalizing DTMF message packets to DTMF tone parameters required by a cellular switch system components such as subscriber services.

BACKGROUND

The mobile communications market has been an international bazaar, with a wide variety of equipment to provide different types of networks and services. National telecommunications companies have been deregulated, only to be partially re-regulated to give newly formed competing companies a chance to establish themselves in the marketplace. As a result, diversity of telecommunications equipment has been accelerated. The deregulating process may yield financial benefits to the consumer due to the competitive pressure on price, but they also introduce devices that are suboptimum and may even delay the realization of the universal mobile telecommunications system ("UMTS").

Mobile communications involve Personal Communications Services ("PCS") that encompass a broad range of services designed to allow people to access public switched telephone networks ("PSTN") regardless of their physical location. As a set of telecommunications features supporting terminal personal and service mobility, PCS will combine many emerging "intelligent network" capabilities of the PSTNs with sophisticated wireless access technologies and related radio network mobility control capabilities. The enormous demand for existing vehicular cellular and residential cordless services demonstrates a widespread public interest in wireless communication and the mobility that it supports. This demand can be expected to grow even more with the evolution to less expensive, lightweight, "pocket-sized" terminals which, combined with various intelligent network services, will provide to the public even greater communications flexibility and portability. Hence, regardless of the many uncertainties, it is reasonable to assume that large segments of the population will eventually have "anytime anywhere" wireless access to PSTNs and services. To plan for this situation, many teletraffic problems will need to be solved.

A major teletraffic problem is equipment incompatibility. A wide variety of equipment from different manufacturers creates a broad spectrum of operational parameters in cellular equipment, causing conflicts between cellular components.

For example, there are different manufacturers of Code Division Multiple Access ("CDMA") mobile stations, such as cellular phones. Mostly, the mobile stations must follow industry standards, such as the "Mobile Station-Base Station Compatibility Standard for Dual-Mode Wideband Spread Spectrum Cellular System," TIA/EIA/IS-95 ("IS-95"). This standard governs communications between a mobile station and a base transceiver station ("BTS"), but does not address the communication requirements for interaction between a mobile station and cellular telecommunication switch equipment. In this respect, the operational parameters from one manufacturer to another can vary.

Because communication standards are not in place to govern communications between the mobile station and the telecommunication switch components, conflicts arise due to the incompatibility between the mobile station and switch components.

Nevertheless, cellular customers expect to receive service quickly after subscribing. This desire for quick service drives the traditional planning task of ensuring that the network has the necessary equipment in place to anticipate growth and services and to move quickly to capture new market opportunities. Consequently, cellular customers are not content to wait while the trouble is detected and time is further spent correcting the problem.

Complications in cellular communications have arisen due to the use of incompatible Dual-Tone Multi-Frequency ("DTMF") signal sequences (for example, "*33") with subscriber service components. For example, in voice mail services ("VMS"), a cellular customer "dials" a numeric digit on the keypad of their mobile station. Each numeric digit has a unique DTMF signal tone with an "on" duration and an "off" duration. Industry standards have not dictated the duration for these tones. Without a standard, mobile station and service equipment manufacturers may have selected incompatible "on" and "off" durations required for their equipment. Without receiving a compatible "on" and "off" DTMF duration, the VMS cannot be accessed by the cellular customer.

To correct the situation, the cellular customer have had to return their mobile station to a service representative to re-program the DTMF signal durations. Only afterwards would a cellular customer be able to use their mobile station with their subscriber services.

The time needed to correct the problem typically takes longer than a customer would be willing to wait because mobile stations cannot be re-programmed at many of the manufacturer sites. Furthermore, the task of reprogramming all the mobile stations to be compatible with subscriber services is also cost prohibitive to the manufacturer of the mobile station.

Thus, a need exists for normalizing the DTMF tones without the need to reprogram mobile stations, and without having to affect the service provider components.

SUMMARY OF THE INVENTION

Thus, in accordance with the present invention, a system for normalizing a Dual-Tone Multi-Frequency ("DTMF") tone is provided for use in a digital wireless telecommunications system. The normalization system has an electronic memory with normalization parameter variable that stores a redefinable value. A programmable DTMF tone generator circuit is coupled to the electronic memory. The tone generator circuit has an input terminal for receiving a DTMF message packet. A program, executable on the DTMF tone generator, normalizes the DTMF message packet by substituting the redefinable value of the parameter variable in the DTMF message packet such that a normalized DTMF tone is transmitted through an output terminal of the DTMF tone generator circuit. According to the method of the present invention, a DTMF message packet from a mobile station is received. A redefinable value is retrieved from a parameter value and correspondingly substituted in the DTMF message packet. A DTMF tone is then transmitted corresponding to the DTMF message packet.

BRIEF DESCRIPTION OF THE DRAWINGS

For a more complete understanding of the present invention, and the advantages thereof, reference is made to the following description taken in conjunction with the accompanying drawings, wherein:

FIG. 4 is an illustration of redefinable values available for the DTMF_ON_LENGTH parameter variable;

FIG. 5 is an illustration of redefinable values available for the DTMF_OFF_LENGTH parameter variable;

FIGS. 6A and 6B are line plot representations of a DTMF signal from a mobile station and the DTMF signal expected by a subscriber service;

FIG. 7 is a flow diagram for selecting the redefinable values to normalize a DTMF message packet; and FIG. 8 is a flow diagram of the DTMF normalization subroutine of the present invention.

DETAILED DESCRIPTION

Figure 1:
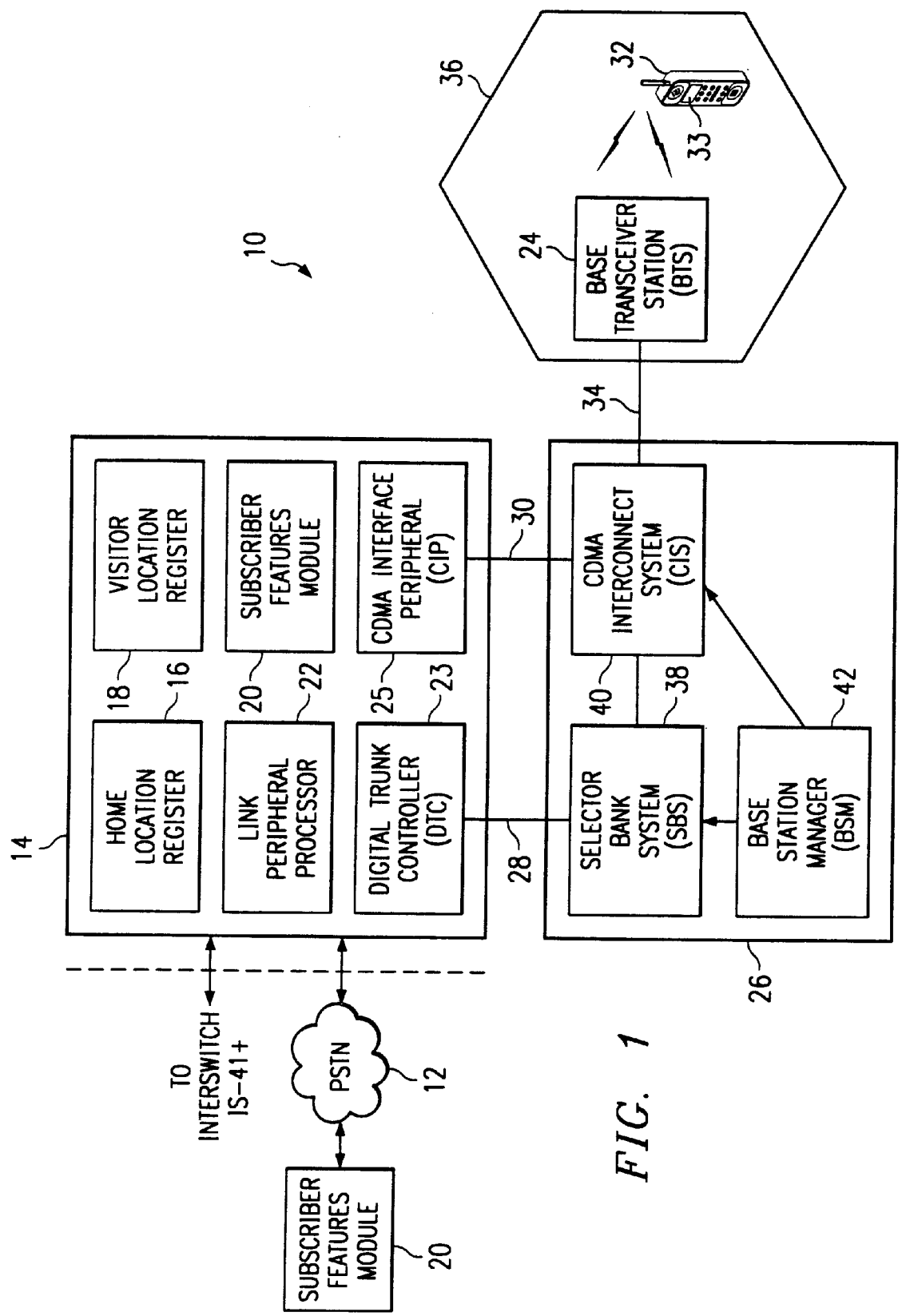
FIG. 1 is a simplified block diagram of a Personal Communications Services ("PCS") environment in which the method and the apparatus of the present invention is deployed.

With reference to the drawings, like reference characters designate like or similar parts throughout the FIGURES.

Referring to FIG. 1, shown is a Personal Communications Services ("PCS") environment in which the invention is deployed. The PCS environment of FIG. 1 illustrates, at a simplified level for clarity, the interconnection between a cellular network 10 and a conventional Public Switch Telephone Network ("PSTN") 12 for a cellular telecommunications system. An example of a preferred PSTN is commercially available under the part designation DMS-MSC from Northern Telecom Limited of Canada.

A DMS-MSC switch performs the switching functions of the telecommunications network by providing a high-capacity transaction processing necessary for any wireless telecommunication service, such DCMA or GSM ("Global System for Mobile Communications") service, and is expandable to accommodate rapid subscriber growth.

The wireless switch 14 is shown as being distinct from the central office ("CO") switching system of the Local Exchange Carrier ("LEC") or other such PSTN 12 telecommunications switches. It should be noted that future systems integration could be implemented to place the wireless switch 14 and the PSTN 12 within a single multifunctional unit.

The wireless switch 14 is responsible for call processing and related ability control (handoff, for example) for mobile-originated or mobile-terminated call traffic. But the wireless switch 14 does not handle "non-mobile" calls. Also, the wireless switch 14 can provide various Intelligent Network ("IN") services to cellular customers, including Home Location Register ("HLR") 16, Visitor Location Register ("VLR") 18, and Subscriber Features Module 20. A preferable wireless switch is the DMS-MTX (Mobile Telephone eXchange), which is commercially available from Northern Telecom Limited of Canada. As shown, the subscriber features module 20 can be resident on the wireless switch 14 or it can be external (non-resident) to the wireless switch 14 such that it is accessed through the PSTN 12.

To provide cellular communications, the wireless switch 14 has a Link Peripheral Processor ("LPP") 22 to establish communication with the PSTN 12.

Communication between the wireless switch 14 and the base transceiver stations ("BTS") 24 is established through a base station controller ("BSC") 26. The BSC 26 is coupled to the wireless switch 14 through a voice/data line 28 and a signaling link 30. The voice/data line 28 operates under the T1/E1 PCM standard for communication links. The voice/data line 28 accommodates voice signals, modem communications, and other information data. Information from the voice/data line 28 can be routed through the wireless switch 14 to call processing units such as the Digital Trunk Controller ("DTC") 23 and the LPP 22.

The signaling link 30 is used to establish a voice/data communication path, through the CDMA Interface Peripheral ("CIP") 25 from the originating number (in this case, the dialing number of the mobile station 32) to the terminating number (in this case the subscriber features module 20).

The BSC 26 is coupled to the BTS 24 through a voice/data line 34, which has the same operational characteristics of the voice/data line 28. Each BTS 24 of a cellular network sends out RF ("Radio Frequency") signals that serve a defined coverage area or cell 36. Generally, mobile stations 32 within the cell 36 communicate with the BTS 24 in the cell 36.

The BSC 26 can manage one or more BTSs 24. The BSC 26 performs functions such as call handoff between BTSs, directing radio communications, supervising the cellular network, and optimizing the entire radio infrastructure in terms of signal strength and service coverage.

With respect to cellular communications routing, the BSC 26 has a Selector Bank Subsystem ("SBS") 38 coupled—through a CDMA Interconnect Subsystem ("CIS") 40—to the BTS 24. A BSM 42 is coupled to the SBS 38 and CIS 40. The BTS 24 receives and transmits radio signals to the mobile station 32. The functional operation of the BTS 24 with respect to the network 10 is to "pass-through" data packets transmitted from the mobile station 32 to the BSC 26.

The CIS 40 is basically a signal router. The CIS 40 provides switching functions to direct the signals applied to its switchable nodes to other components within the BSC 26. Signals from a mobile station 32 (via the BTS 24) are passed through the CIS 40 to the SBS 38 (or one of many SBSs). From the SBS 38, the signal is conveyed through the wireless switch 14 to the PSTN 12. It should be noted that the other components shown within the BSC 26 communicate with one another and with the CIS 40 via its switchable nodes.

At least one SBS 38 handles the digital processing/translation functions for the BSC 26. The BSM 42 of the BSC 26 is used, in part, to configure one or more BSC components, such as the programmable DSP functions of the SBS 38. The BSM 42 provides a user interface to provide these configurations. The BSM 42 is preferably a powerful stand-alone computer with considerable calculating capability such as a Sun Workstation available from Sun Microsystems of Palo Alto, Calif. The workstation has an executable user interface program, such as a Graphic User Interface ("GUI") to receive commands from a user.

The subscriber features module 20 can reside on the wireless switch 14 or be accessed by establishing a call leg from a mobile station, as represented by the sub-designation 20a and 20b in FIG. 1. The distinguishing characteristic between the SFM 20a and 20b is by access scheme used.

Figure 2:
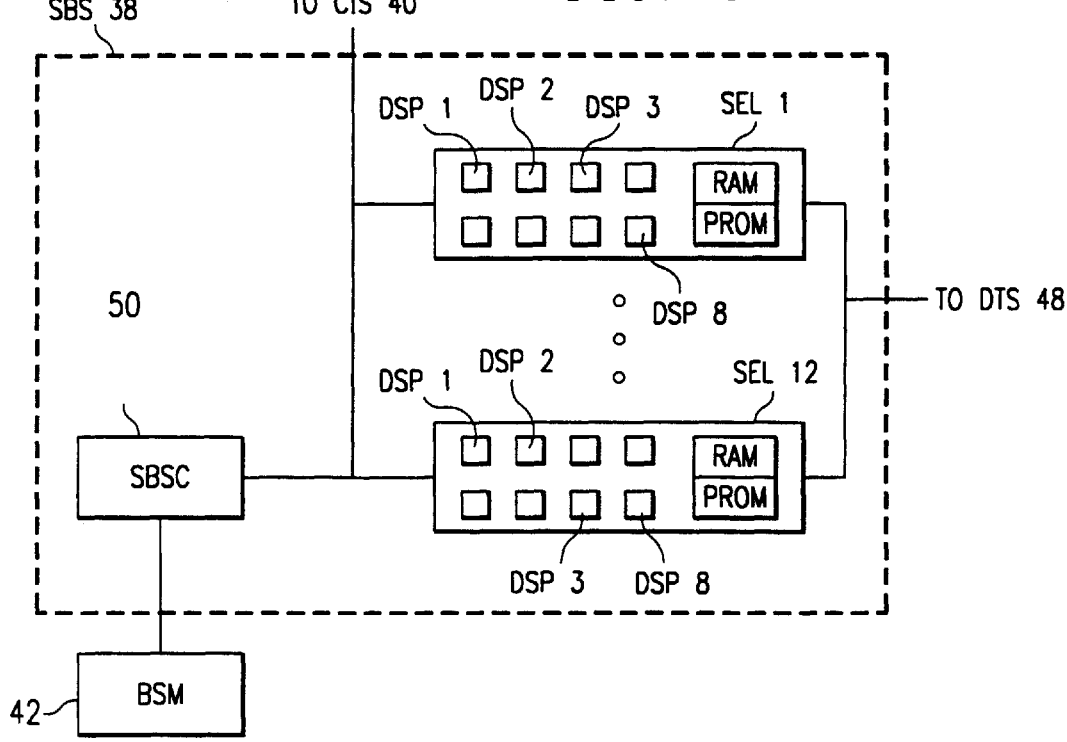
FIG. 2 is a simplified block diagram illustrating the interaction between a base station manager and the selector bank system having multiple digital signal processors to produce DTMF tones that correspond to a DTMF message packet.

FIG. 2 is a simplified block diagram illustrating the interaction between the BSM 42 and the SBS 38. The BSM 42 is coupled to the SBS controller ("SBSC") 50. The SBSC 50 controls access to the selector cards SEL1 through SEL12. The SBS 38 has at least one selector card SEL, but can have as many as necessary to accommodate the communication traffic from the BTSs coupled to the BSC 26 (FIG. 1), limited by the physical capacity of the SBSC 50.

The selector cards SEL1 through SEL12 each have at least one DSP circuit. A DSP is a specialized processor designed for high-speed data manipulations. A conventional selector card has up to eight DSP chips.

Like a conventional microprocessor, a DSP can be programmed to provide numerous processing functions, the program residing in a program memory such as an EPROM ("Erasable Programmable Read-Only Memory") or other such nonvolatile memory chips. A RAM ("Random Access Memory") is also present as temporary storage so that the DSP can carry out its processing functions. The RAM is typically used for storing variables as dictated by the BSM 42.

For telecommunication applications, each DSP has a portion defining a conventional DTMF tone generator circuit defined by hardware and firmware that converts a DTMF message packet into a DTMF tone. It should be noted that a DTMF tone generator circuit can also be a separate DTMF transceiver chip coupled to a programmable microprocessor to carry out the present invention, but preferably the DTMF tone generator circuit is a part of the DSP for accessing-speed concerns. A DTMF tone is the "tone dialing" system based on outputting two non-harmonic related frequencies simultaneously to identify the number dialed. Eight frequencies have been assigned to the four rows and four columns of a conventional keypad.

Figure 3:
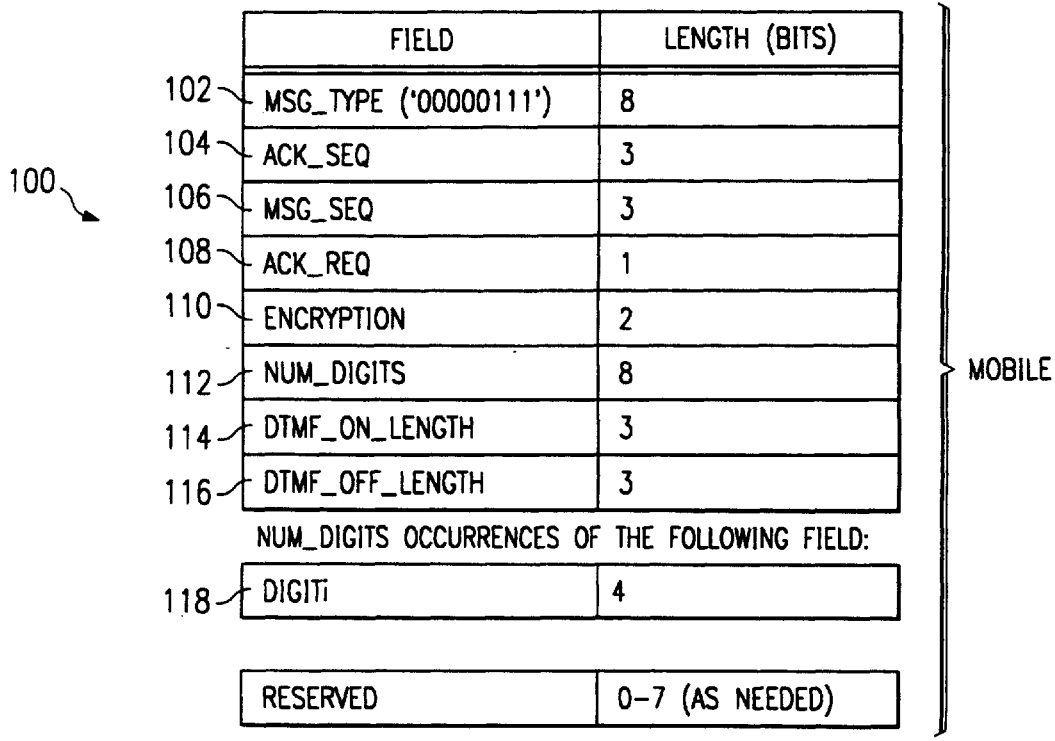
FIG. 3 is an illustration of a digital DTMF message packet.

FIG. 3 illustrates a digital DTMF message packet 100. This format is dictated by the IS-95 cellular communications standard, discussed earlier.

The mobile station 32 (FIG. 1) transmits DTMF information using this packet format. The message format illustrated is specified as a "Send Burst DTMF Message." The DTMF message packet 100 has the following fields: a message type ("MSG_TYPE") field 102, an acknowledgement sequence number ("ACK_SEQ") field 104, a message sequence number ("MSG_SEQ") field 106, an acknowledgement required indicator ("ACK_REQ") field 108, a message encryption indicator ("ENCRYPTION") field 110, a number of DTMF digits ("NUM_DIGITS") field 112, a DTMF pulse width code ("DTMF_ON_LENGTH") field 114, a DTMF interdigit interval code ("DTMF_OFF_LENGTH") field 116, and a DTMF digit ("DIGITi") field 118.

With respect to converting or translating DTMF message formats in the present invention, the fields of importance are the DTMF_ON_LENGTH field 114 and the DTMF_OFF_LENGTH 116.

The DTMF_ON_LENGTH field contains a value that corresponds to the requested width of DTMF pulses to be generated, and can have the redefinable values shown in FIG. 4.

The DTMF_OFF_LENGTH field 116 contains a redefinable value regarding the minimum interval between DTMF pulses to be generated. Under the IS-95 standard, the DTMF_OFF_LENGTH field can have the redefinable values shown in FIG. 5.

The NUM_DIGITS field 112 designates the number of digits in the message 100. Accordingly, a DIGITi field 118 is generated for each DTMF tone to be generated. The mobile station 32 sets each occurrence of this field to the field value.

FIGS. 6A and 6B are signal plots illustrating the DTMF tones designated by a mobile station and the DTMF tone requirements of a subscriber service. A subscriber service 20 (FIG. 1) can be accessed by a cellular customer through a sequence of DTMF tones. For example, the cellular customer presses the DTMF keys "33" to access a VMS in the subscriber features module 20. The parameters sent by the mobile station are:

DTMF_ON_LENGTH=000 (95 milliseconds)
DTMF_OFF_LENGTH=001 (100 milliseconds)
NUM_DIGITS=010 (two digits)
DIGIT(1)=0011 (DTMF Digit "3")
DIGIT(2)=0011 (DTMF Digit "3")

Referring to FIG. 6A, the representation of the DTMF tones that would be generated by a mobile station are illustrated where the interdigit delay A is 100 milliseconds and the tone duration B is 95 milliseconds.

Referring to FIG. 6B, illustrated is a signal plot of the format of the DTMF signal tone expected by a subscriber service 20. As shown, the interdigit delay C for the expected DTMF signal tone must be no greater than 60 milliseconds. If the interdigit delay C for the signal being sent to the subscriber service is greater than 60 milliseconds, then the signal will be misinterpreted and access to the subscriber service will be denied. The tone duration D as depicted is 95 milliseconds.

With the example provided, the mobile station 32 sends a signal having an interdigit delay A, represented by the DTMF_OFF_LENGTH variable. The interdigit delay A is greater than the interdigit delay C expected by the subscriber service 20. Accordingly, the subscriber service would detect the code as two separate DTMF digits (that is, 3 . . . 3), instead of the DTMF code sequence "33" sent by the cellular customer.

As discussed earlier, in such event the cellular customer must have their mobile station reprogrammed to have an interdigit delay acceptable to their subscribed service. Such situations are increasing with the proliferation of cellular services and various brands and modes of mobile stations.

Thus, to improve portability of different mobile stations 32—each potentially having dissimilar DTMF parameters—the invention described herein normalizes or overrides parameters in the DTMF message packet to be compatible with the signalling requirements of the subscriber feature. The term "normalize" as used means to conform the DTMF message packet to the DTMF requirements of the telecommunications system.

FIG. 7 is a flow diagram for selecting the DTMF parameter values to normalize the DTMF output of the DTMF generator circuit in the DSPs. The process disclosed is a subroutine preferably executed on the BSM 42 (FIG. 2). At step 202, a user is allowed to select whether to engage DTMF message normalization. At step 204, if the user opted to normalize the DTMF message, then the user is prompted in step 206 to select redefinable values for the DTMF_ON_LENGTH and DTMF_ON_LENGTH variables used to normalize the values submitted in the DTMF message packet 100 from a mobile station 32. Else, the subroutine exits at step 212. In step 208, the processing component is accessed. In step 210, the selected redefinable values are loaded and stored in the volatile memory—RAM for example—of the processing component at the DTMF_ON_LENGTH and DTMF_OFF_LENGTH variable addresses. The variables can be designated on the DSP local (resident) memory or the SBSC 50 local memory. Preferably, the variables are designated on the DSP local (resident) memory. Also, a NORMALIZE_FLAG variable is set to contain a TRUE value. Afterwards, the subroutine is exited at step 212.

Referring back to FIGS. 1 and 2, the processing component of the present embodiment is the SBS 38. The BSM 42 accesses the SBS 38 through the SBSC 50. Through the SBSC 50, the BSM 42 accesses the selector cards SEL1 through SEL12 (if more than one selector card is present). The local (resident) memory of the selector cards is loaded with the redefinable value—selected by the user in step 206 of FIG. 7—at the DTMF_ON_LENGTH and DTMF_OFF_LENGTH parameter variable address. Likewise, the contents of the NORMALIZE_FLAG variable is stored in the resident memory for access by the DTMF tone circuit in the DSPs. It is preferable to store the values on resident memory to minimize the access delay that could result from having to access non-resident memory (such as the memory on the SBSC 50) for these values.

FIG. 8 is a flow diagram for a DTMF normalization subroutine of the DTMF_ON_LENGTH field 114 and DTMF_OFF_LENGTH field 116 of a DTMF message packet 100 received from a mobile station 32 (FIG. 1). The subroutine begins at step 300, and determines at step 302 whether a DTMF message was received from a mobile station.

If a DTMF message was not received, then the DSP continues to wait for such a message from a mobile station. Else, a DTMF message was received, and in step 304, the NORMALIZE_FLAG variable is queried. If the NORMALIZE_FLAG variable is set or "TRUE", then in step 306 the redefinable values stored in the DTMF_ON_LENGTH and DTMF_OFF_LENGTH variables are retrieved, and in step 308, the values in the received DTMF message fields 114 and 116 (see FIG. 3) are substituted with the corresponding redefinable DTMF values. If the NORMALIZE_FLAG is not set or is "FALSE", then the DTMF message packet 100 is processed by the respective DSP, and DTMF tones are generated by the DSP through the DTMF tone generator circuit (see FIG. 2).

By conducting DTMF normalization at the switch, component incompatibility is eliminated between a mobile station 32 and a subscriber service. Furthermore, normalization can be conducted for multiple user services. For example, the VMS above is accessed with the DTMF tones "33." Another service, such as the HLR 16 could be accessed with the DTMF tones "88," but having interdigit delay times different from the VMS subscriber service. Accordingly, two sets of DTMF_ON_LENGTH and DTMF_OFF_LENGTH variables can be established for each services such that DTMF message packets destined for either service can be normalized to accommodate either service.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It is therefore, contemplated that the claims will cover any such modifications or embodiments that fall within the true scope of the invention.

What is claimed is:

1. A system for normalizing a Dual-Tone Multi-Frequency ("DTMF") tone used in a digital wireless telecommunications system having a plurality of DTMF requirements comprising:

an electronic memory having at least a first and a second parameter variable, each of said first and said second parameter variables storing a redefinable value; and a programmable DTMF tone generator circuit, said DTMF tone generator circuit coupled to said electronic memory and having an input terminal for receiving a DTMF message packet and an output terminal for transmitting a DTMF tone corresponding to the DTMF message packet; and a program executable on said DTMF tone generator, said program normalizing said DTMF message packet to conform the message packet to the DTMF requirements of the telecommunications system by substituting said redefinable value of each of said first and said second parameter variable in said DTMF message packet such that a normalized DTMF tone corresponding to the DTMF message packet is transmitted through said output terminal.

2. The system of claim 1 wherein said first parameter variable is an off-length duration for a DTMF tone.

3. The system of claim 1 wherein said second parameter variable is an on-length duration for a DTMF tone.

4. The system of claim 1 further comprising:

a wireless telecommunications switch coupled to said output terminal of said DTMF tone generator circuit; and a subscriber service coupled to said telecommunications switch such that said subscriber service can receive said normalized DTMF tone from said DTMF tone generator circuit.

5. The system of claim 1 further comprising:

a user interface coupled to said DTMF tone generator circuit, said user interface for accepting from a user said redefinable value for each of said first and said second parameter variables and for storing said redefinable value in said electronic memory.

6. The system of claim 5 wherein said user interface comprises:

a Base Station Manager ("BSM"); and a graphic user interface program executable on said BSM.

7. The system of claim 6 wherein said BSM is a computer workstation.

8. The system of claim 1 wherein said DTMF message packet comprises a header field, a duration field, and a digit field.

9. The system of claim 1 wherein said DTMF tone generator circuit is a digital signal processor.

10. The system of claim 1 wherein said DTMF tone generator circuit is a DTMF transceiver coupled to a microprocessor.

11. A microprocessor-executable method for providing a normalized DTMF signal on a digital wireless telecommunications system having a plurality of DTMF requirements, the method comprising the steps of:

receiving a Dual Tone Multi-Frequency ("DTMF") message packet from a mobile station;

retrieving from at least a first and a second parameter variable a redefinable value;

substituting corresponding parameters in the DTMF message packet with the redefinable value stored in the first and the second parameter variable to conform the message packet to the DTMF requirements of the telecommunications system; and transmitting a DTMF tone corresponding to the DTMF message packet, said packet having the at least a first and a second parameter variable.

12. The method for providing a configurable DTMF signal of claim 11 further comprising the step of:

providing the redefinable value through a user interface.

13. The method of claim 11 wherein the DTMF message packet comprises a header field, a duration field, and a digit field.

14. The system of claim 11 wherein the first parameter variable is an off-length duration for a DTMF tone.

15. The system of claim 11 wherein the second parameter variable is an on-length duration for a DTMF tone.

16. An apparatus for providing a normalized DTMF signal on a digital wireless telecommunications system having a plurality of DTMF requirements comprising:

means for receiving a Dual Tone Multi-Frequency ("DTMF") message packet from a mobile station;

means for retrieving from at least a first and a second parameter variable a redefinable value;

means for substituting corresponding parameters in the DTMF message packet with the redefinable value stored in the first and the second parameter variable to conform the message packet to the DTMF requirements of the telecommunications system; and means for transmitting a DTMF tone corresponding to the DTMF message packet, said packet having the at least a first and a second parameter variable.

17. The apparatus of claim 16 further comprising:

means for providing the redefinable value through a user interface.

* * * * *